United States Patent
Wieland et al.

(10) Patent No.: US 9,644,588 B2
(45) Date of Patent: May 9, 2017

(54) FUEL METERING UNIT FOR A FUEL METERING UNIT FOR A HIGH-PRESSURE FUEL PUMP, AND HIGH-PRESSURE FUEL PUMP

(75) Inventors: Steffen Wieland, Waiblingen (DE); Marion Schieber-Stitz, Weissach Im Tal (DE); Tobias Landenberger, Schorndorf (DE); Tilman Miehle, Waiblingen (DE); Jochen Wessner, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 1456 days.

(21) Appl. No.: 12/747,735

(22) PCT Filed: Nov. 27, 2008

(86) PCT No.: PCT/EP2008/066285
§ 371 (c)(1),
(2), (4) Date: Jun. 11, 2010

(87) PCT Pub. No.: WO2009/074457
PCT Pub. Date: Jun. 18, 2009

(65) Prior Publication Data
US 2010/0288233 A1     Nov. 18, 2010

(30) Foreign Application Priority Data
Dec. 12, 2007   (DE) ........................ 10 2007 059 855

(51) Int. Cl.
*B05B 1/02* (2006.01)
*F02M 51/06* (2006.01)
(Continued)

(52) U.S. Cl.
CPC .......... *F02M 59/205* (2013.01); *F02M 59/34* (2013.01); *F02M 59/445* (2013.01);
(Continued)

(58) Field of Classification Search
CPC ....................... F02M 63/0071; F02M 2200/02
(Continued)

(56) References Cited

U.S. PATENT DOCUMENTS 4,038,858 A * 8/1977 DeZuba ........................ 72/274
4,482,094 A    11/1984 Knape
(Continued)

FOREIGN PATENT DOCUMENTS

DE         10247436 A1    5/2003
DE     102005025872 A1   12/2006
(Continued)

*Primary Examiner* — Marina Tietjen
*Assistant Examiner* — Seth W Mackay-Smith
(74) *Attorney, Agent, or Firm* — Michael Best & Friedrich LLP

(57) ABSTRACT

The invention relates to a fuel metering device for regulating the delivery rate of a high-pressure fuel pump of a fuel injection device for an internal combustion engine. The fuel metering device has a control valve actuated by an electromagnet and having a valve member. The electromagnet has an armature and an armature rod and the armature rod is axially movably supported in at least one bushing. The at least one bushing is designed as a solid, one-piece metal component. The bushing is preferably made of steel and the bearing surface thereof, in which the armature rod is supported, has a nitrocarburized and polished surface layer.

15 Claims, 2 Drawing Sheets

(51) Int. Cl.
  *F16K 31/06* (2006.01)
  *F02M 59/20* (2006.01)
  *F02M 59/44* (2006.01)
  *F02M 63/00* (2006.01)
  *F02M 59/34* (2006.01)

(52) U.S. Cl.
  CPC ...... *F02M 63/004* (2013.01); *F02M 63/0017* (2013.01); *F02M 63/0031* (2013.01); *F16K 31/0613* (2013.01); *F16K 31/0668* (2013.01); *F02M 2200/02* (2013.01); *F02M 2200/8069* (2013.01); *F02M 2200/9038* (2013.01); *F02M 2200/9061* (2013.01)

(58) Field of Classification Search
  USPC .......... 239/585.1, 585.2, 586; 324/129, 192, 324/276, 279
  See application file for complete search history.

(56) References Cited

U.S. PATENT DOCUMENTS

| | | | |
|---|---|---|---|
| 4,710,034 A * | 12/1987 | Tittizer et al. | 384/110 |
| 5,671,878 A * | 9/1997 | Kawasaki | 226/196.1 |
| 5,727,447 A * | 3/1998 | Shiraishi et al. | 92/164 |
| 6,467,669 B1 * | 10/2002 | Okada | 226/194 |
| 6,519,847 B1 * | 2/2003 | Trudeau et al. | 29/888.44 |
| 6,886,546 B1 * | 5/2005 | Bircann et al. | 123/568.23 |
| 7,423,421 B2 * | 9/2008 | Reichert et al. | 324/207.24 |
| 7,588,229 B2 * | 9/2009 | Eiser et al. | 251/129.02 |
| 7,878,480 B2 * | 2/2011 | Vattaneo et al. | 251/129.02 |
| 8,387,946 B2 * | 3/2013 | Itoafa et al. | 251/129.02 |
| 2001/0013556 A1 | 8/2001 | Ganser | |
| 2001/0028005 A1 | 10/2001 | Nagai et al. | |
| 2003/0089872 A1 | 5/2003 | Furuta et al. | |
| 2004/0261771 A1 | 12/2004 | Ichinose et al. | |
| 2006/0093247 A1 * | 5/2006 | Shimizu et al. | 384/279 |
| 2007/0041672 A1 * | 2/2007 | Maruyama et al. | 384/279 |
| 2007/0069576 A1 * | 3/2007 | Suzuki | 303/155 |
| 2007/0211972 A1 * | 9/2007 | Kruse et al. | 384/206 |
| 2008/0011886 A1 * | 1/2008 | Abe et al. | 239/585.1 |
| 2008/0271708 A1 | 11/2008 | Rodriguez-Amaya | |

FOREIGN PATENT DOCUMENTS

| | | |
|---|---|---|
| EP | 1146222 A2 | 10/2001 |
| WO | 2006131408 A1 | 12/2006 |

* cited by examiner

FUEL METERING UNIT FOR A FUEL METERING UNIT FOR A HIGH-PRESSURE FUEL PUMP, AND HIGH-PRESSURE FUEL PUMP

CROSS-REFERENCE TO RELATED APPLICATION

This application is a 35 USC 371 application of PCT/EP2008/066285 filed on Nov. 27, 2008.

BACKGROUND OF THE INVENTION

Field of the Invention

The invention is based on a fuel metering unit for a high-pressure fuel pump.

Description of the Prior Art

One such fuel metering unit is known from German Patent Disclosure DE 10 2005 025 872 A1. This fuel metering unit serves to regulate the delivery quantity on the intake side of a high-pressure fuel pump that is part of a fuel injection system of an internal combustion engine. The fuel metering unit has a regulating valve which is actuated by an electromagnet and has a valve member and by which different flow cross sections can be established in the intake region of the high-pressure fuel pump, making it possible to regulate the delivery quantity of the high-pressure fuel pump. The electromagnet has an armature and a movable armature bolt, by which bolt the valve member is movable. The armature bolt is axially displaceably guided in at least one bearing bush. This at least one bearing bush may be made from bronze, for instance. Typically, bearing bushes are produced by rolling from a strip material, so that they have a cross joint. During operation of the fuel metering unit, swelling of the bearing bush can occur, causing it to widen. Moreover, the dimensional stability of such rolled bearing bushes may not be sufficient under some circumstances. It is also known for such bearing bushes to be provided, in the region of the bearing face in which the armature bolt is guided, with a coating, for instance of PTFE, in order to improve the sliding properties and keep wear low. However, the production of such coatings will no longer be permitted in various markets, such as the United States, because of their environmental harmfulness (for instance, using PFOA). The usual rolled bearing bushes have a slight wall thickness, so that a receptacle corresponding in diameter to approximately the diameter of the armature bolt is necessary for the bearing bush.

ADVANTAGES AND SUMMARY OF THE INVENTION

The fuel metering unit of the invention has the advantage that precise support of the armature bolt and low wear of the bearing are made possible. The bearing bush can be made as a solid component with high precision, and it does not deform, even during operation of the fuel metering unit. As a result of the bearing bush embodied as a solid component, even relatively large differences in diameter between the diameter of the armature bolt and the diameter of a receptacle for the bearing bush can be compensated for.

By means of the embodiment according to one feature of the invention, the sliding properties and high wear resistance of the bearing of the armature bolt are made possible.

BRIEF DESCRIPTION OF THE DRAWINGS

One exemplary embodiment of the invention is shown in the drawings and explained in further detail in the ensuing description in conjunction with the drawings, in which.

DESCRIPTION OF THE PREFERRED EMBODIMENT

Figure 1:
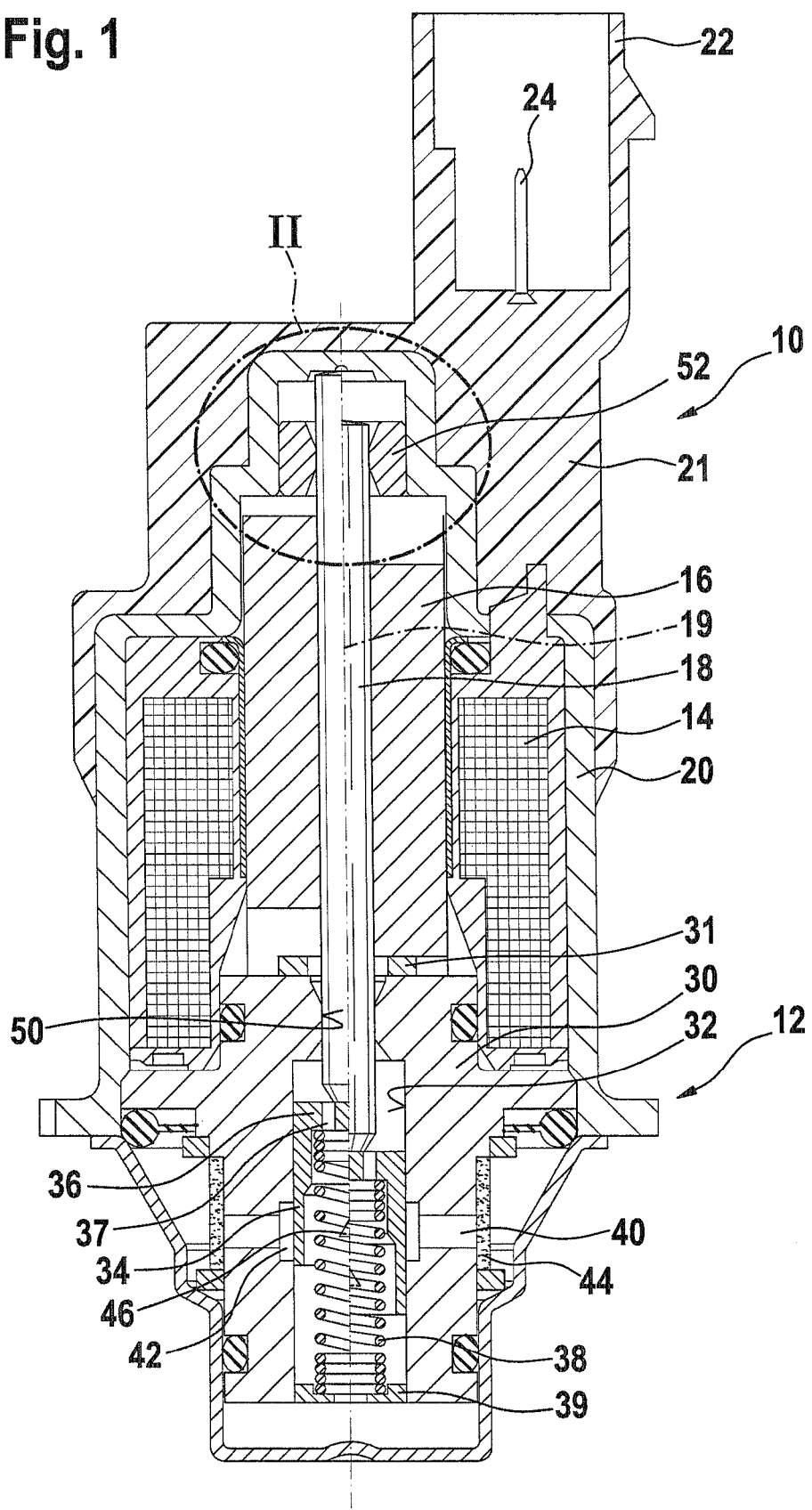
FIG. 1 shows a fuel metering unit in a longitudinal section.

In FIG. 1, a fuel metering unit of the invention is shown in a longitudinal section. The fuel metering unit is disposed in a fuel flow between a prefeed pump and a high-pressure fuel pump of a fuel injection system for an internal combustion engine and serves to variably adjust the fuel quantity delivered by the high-pressure fuel pump. By means of the fuel metering unit, a variable flow cross section is established between the prefeed pump and the high-pressure fuel pump. The fuel metering unit is triggered by an electronic control device by which engine operating parameters are evaluated, and as a function thereof, a required delivery quantity of the high-pressure fuel pump is ascertained. The fuel metering unit may be disposed on the high-pressure fuel pump or may form a separate component unit.

The fuel metering unit has an electromagnet 10 and a regulating valve 12 actuated by the electromagnet. The essential components of the electromagnet 10 are a magnet coil 14, an armature 16 with an armature bolt 18, and a magnet cup 20 that partly surrounds the magnet coil 14 and the armature 16. The magnet cup 20 is partly spray-coated with plastic, and at the spray-coating 21, a plug housing 22 is embodied in which at least one electrical terminal 24 for the magnet coil 14 is disposed.

The regulating valve 12 has a valve housing 30, which simultaneously acts as the magnet core. In the valve housing 30, a longitudinal bore is provided in which a pistonlike valve member 34 of the regulating valve 12 is displaceably guided. The valve member 34 is cup-shaped and hollow, and the armature bolt 18 rests with its face end on the bottom 36 of the valve member. The valve member 34 is kept in contact with the armature bolt 18 by means of a prestressed spring 38 disposed in it, for instance a helical compression spring. The spring 38 is braced on one end on the inside of the bottom 36 of the valve member 34 and on the other on an annular securing element 39 inserted into the longitudinal bore 32. At least one and preferably a plurality of openings 37 are provided in the bottom 36 of the valve member 34, through which openings the fuel can flow upon the axial motion of the valve member 34 in the longitudinal bore 32. By means of the openings 37, a pressure equalization on both sides of the valve member 34 in the longitudinal bore 32 is made possible, so that the valve member 34 is at least approximately pressure-balanced.

At the circumference of the valve housing 30, at least one and preferably a plurality of openings 40 are provided, for instance in the form of radial bores, which communicate with a fuel inlet from the prefeed pump. At the circumference of the longitudinal bore 32 in the valve housing 30, the openings 40 may discharge in an encompassing annular groove 42. In the region of the openings 40, an annular filter 44 may be disposed on the valve housing 30, and this filter prevents contamination from entering the regulating valve 12. The fuel outflow from the regulating valve 12 to the high-pressure fuel pump is effected from the interior of the valve member 34 through the open side, remote from the electromagnet 10, of the valve housing 30, from the longitudinal bore 32.

In its circumference, near its open end, the valve member 34 has at least one and preferably a plurality of control openings 46, by which, upon the axial motion of the valve member 34 in the longitudinal bore 32, the size of the flow cross section between the inlet and outlet of the regulating valve 12 is controlled. The control openings 46 may for instance have a triangular, trapezoidal or rectangular cross section. The more the control openings 46 coincide with the annular groove 42, the greater is the flow cross section. In the currentless state of the electromagnet 10, the valve member 34 is in an open position, effected by the spring 38, in which position its control openings 46 fully coincide with the annular groove 42, so that the flow cross section is fully open; that is, the maximum fuel quantity can flow from the prefeed pump through the regulating valve 12 to the high-pressure fuel pump. With an increasing supply of current to the electromagnet 10, the valve member 34 is displaced in the longitudinal bore 32 by the armature bolt 18, counter to the force of the spring 38, so that the control openings 46 of the valve member come to coincide to a lesser extent with the annular groove 42, and a smaller flow cross section from the prefeed pump to the high-pressure fuel pump is opened up. If the control openings 46 are no longer in coincidence with the annular groove 42, then the flow cross section is closed. By means of the cross-sectional shape of the control openings 46, different characteristics of the course of the established flow cross section can be achieved as a function of the stroke of the valve member 34. In FIG. 1, the valve member 34 is shown in its fully open position in the left half and in its closed position in the right half. Between the armature 16 and the valve housing 30 is a remanent air gap disk 31, which prevents the armature 16 from coming into contact with the valve housing 30.

Figure 2:
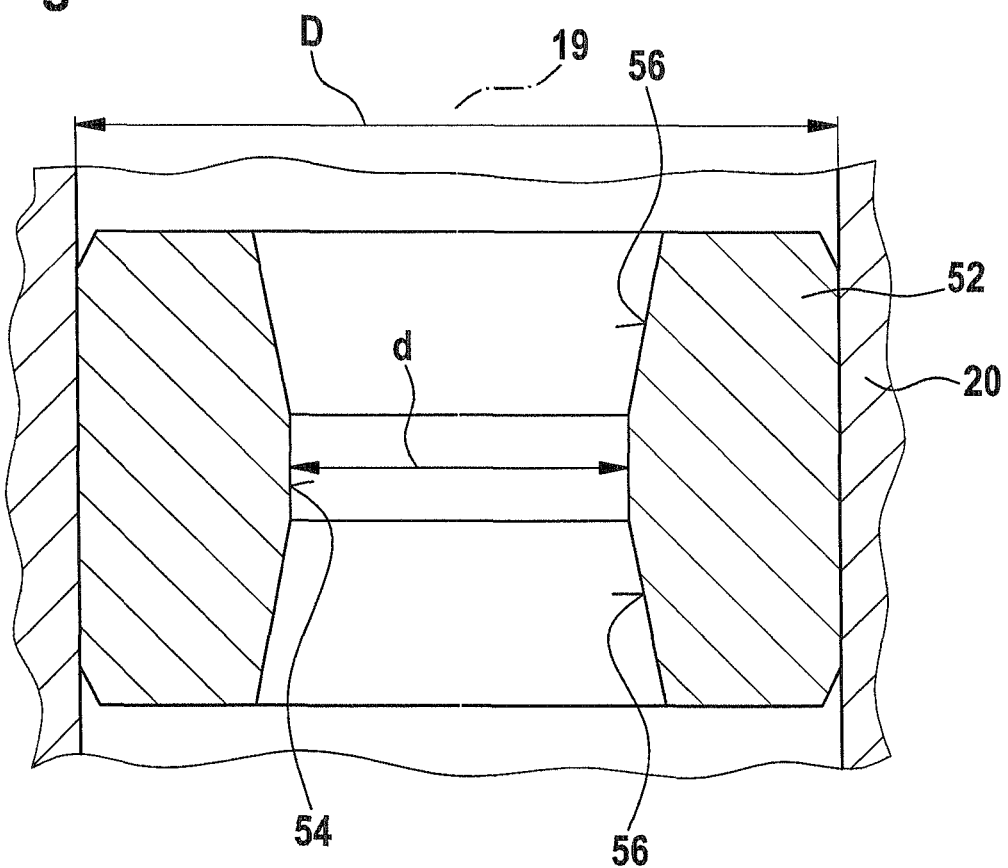
FIG. 2, in an enlarged view, shows a bearing bush in a detail marked II of the fuel metering unit of FIG. 1.

From the magnet cup 20, the armature bolt 18 protrudes through an opening 50 in the valve housing 30 into the longitudinal bore 32. The opening 50 can form a bearing point for the armature bolt 18 at which the armature bolt is guided displaceably in the direction of its longitudinal axis 19. In its end region, remote from the valve housing 30, the armature bolt 18 is guided displaceably in a bearing bush 52 in the direction of its longitudinal axis 19. The bearing bush 52 is inserted, for instance press-fitted, into a hollow-cylindrical receptacle in the magnet cup 20. The bearing bush 52 will now be described with reference to FIG. 2. The bearing bush 52 is embodied as a solid, undivided metal component with a cylindrical outer shape, and it has an outer diameter D by way of which the bearing bush 52 is press-fitted into the receptacle in the magnet cup 20. The bearing bush 52 is of steel, for instance, and is made by means of a metal-cutting production process, such as turning and drilling. By means of this metal-cutting production process, it is possible for the bearing bush 52 to be produced with high precision in terms of dimensions and shape.

On its inside, the bearing bush 52, in its middle region in terms of the axial direction, that is, in the direction of the longitudinal axis 19 of the armature bolt 18, has an at least approximately cylindrical or slightly convexly curved bearing face 54, with a diameter d, in which bearing face the armature bolt 18 is guided with slight radial play. The bearing face 54 of the bearing bush 52 preferably has a nitrocarburized surface layer. The nitrocarburized surface layer is created by enriching the peripheral layer of the steel with nitrogen and carbon while simultaneously heating the steel. The surface of the bearing face 54 is furthermore preferably ground, in particular vibration-ground, or in other words polished in the direction of the longitudinal axis 19 of the armature bolt 18. Because of the nitrocarburized and ground surface of the bearing face 54, good sliding properties and high wear resistance are attained. On the inside of the bearing bush 52, noncylindrical faces 56 adjoin the bearing face 54 in the axial direction; they may for instance be approximately conical or curved. The faces 56 are embodied such that the inner diameter of the bearing bush 52 increases in the axial direction away from the bearing face 54. Thus between the armature bolt 18 and the faces 56 there is greater radial play than between the armature bolt 18 and the bearing face 54, so that the guidance of the armature bolt 18 is effected essentially only in the bearing face 54.

The inner diameter d and the outer diameter D and thus the wall thickness of the bearing bush 52 can be selected arbitrarily within wide ranges. With the bearing bush 52, relatively large differences in diameter between the armature bolt 18 and the receptacle of the bearing bush 52 in the magnet cup 20 can thus be compensated for. This facilitates the production of the magnet cup 20, since this cup must have a relatively large diameter in the region of the armature 16, and the adjoining receptacle for the bearing bush 52 must be embodied as only slightly smaller in diameter, since the difference in diameter from the armature bolt 18 is compensated for by the bearing bush 52.

The foregoing relates to the preferred exemplary embodiment of the invention, it being understood that other variants and embodiments thereof are possible within the spirit and scope of the invention, the latter being defined by the appended claims.

The invention claimed is:

1. A fuel metering unit for regulating the delivery quantity on the intake side of a high-pressure fuel pump of a fuel injection system for an internal combustion engine, in which the fuel metering unit has a regulating valve that is actuated by an electromagnet and that has a valve member, the electromagnet having an armature and an armature bolt, the armature bolt being supported axially displaceably in at least one bearing bush, wherein the at least one bearing bush is embodied as a solid, undivided metal component, the bearing bush includes a bearing face in which the armature bolt is guided, the bearing face is at least slightly convexly curved in an axial direction of a longitudinal axis of the armature bolt, wherein, in the bearing bush, the bearing face is adjoined in the axial direction of the armature bolt by noncylindrical faces, wherein the noncylindrical faces are embodied as conical or curved, an inner diameter of the bearing bush increases in the axial direction moving away from the bearing face, and the bearing face is shorter than each of the noncylindrical faces.

2. The fuel metering unit as defined by claim 1, wherein the bearing bush is produced by metal-cutting machining.

3. The fuel metering unit as defined by claim 2, wherein the bearing bush is made from steel, and at least on its bearing face in which the armature bolt is guided, it has a nitrocarburized surface layer.

4. The fuel metering unit as defined by claim 3, wherein the bearing face of the bearing bush has a vibration-finished surface.

5. The fuel metering unit as defined by claim 2, wherein the bearing face of the bearing bush has a vibration-finished surface.

6. A high-pressure fuel pump for a fuel injection system of an internal combustion engine, having a fuel metering unit for regulating the delivery quantity on the intake side, wherein the fuel metering unit is embodied in accordance with claim 2.

7. The fuel metering unit as defined by claim 1, wherein the bearing bush is made from steel, and at least on its bearing face in which the armature bolt is guided, it has a nitrocarburized surface layer.

8. The fuel metering unit as defined by claim 7, wherein the bearing face of the bearing bush has a vibration-finished surface.

9. A high-pressure fuel pump for a fuel injection system of an internal combustion engine, having a fuel metering unit for regulating the delivery quantity on the intake side, wherein the fuel metering unit is embodied in accordance with claim 7.

10. The fuel metering unit as defined by claim 1, wherein the bearing face of the bearing bush has a vibration-finished surface.

11. A high-pressure fuel pump for a fuel injection system of an internal combustion engine, having a fuel metering unit for regulating the delivery quantity on the intake side, wherein the fuel metering unit is embodied in accordance with claim 10.

12. A high-pressure fuel pump for a fuel injection system of an internal combustion engine, having a fuel metering unit for regulating the delivery quantity on the intake side, wherein the fuel metering unit is embodied in accordance with claim 1.

13. The fuel metering unit as defined by claim 1, wherein the noncylindrical faces extend away from the bearing face in respective opposite directions.

14. The fuel metering unit as defined by claim 13, wherein a diameter of each of the noncylindrical faces increases moving away from the bearing face.

15. A fuel metering unit for regulating the delivery quantity on the intake side of a high-pressure fuel pump of a fuel injection system for an internal combustion engine, in which the fuel metering unit has a regulating valve that is actuated by an electromagnet and that has a valve member, the electromagnet having an armature and an armature bolt, the armature bolt being supported axially displaceably in at least one bearing bush, wherein the at least one bearing bush is a solid, undivided metal component, the bearing bush includes a bearing face in which the armature bolt is guided, the bearing face is at least slightly convexly curved in an axial direction of a longitudinal axis of the armature bolt, in the bearing bush, the bearing face is adjoined in the axial direction of the armature bolt by noncylindrical faces, the noncylindrical faces are embodied as conical along a length longer than the bearing face, and an inner diameter of the bearing bush increases in the axial direction moving away from the bearing face.

* * * * *